Patent Number: 4,811,765
Date of Patent: Mar. 14, 1989

[54] FUEL PUMP LEVER HOLDING MEMBER
[76] Inventor: Salvador N. Giha, 77 N. Court Rd., Tiverton, R.I. 02878
[21] Appl. No.: 174,139
[22] Filed: Mar. 28, 1988
[51] Int. Cl.⁴ .......................... B65B 3/04; B65D 51/24
[52] U.S. Cl. ..................................... 141/392; 141/390; 251/90; 74/526; 220/DIG. 33
[58] Field of Search ................. 141/392, 390; 251/90, 251/107; 74/526; 224/901; 220/DIG. 33, 1 V

[56] References Cited
U.S. PATENT DOCUMENTS

| | | | |
|---|---|---|---|
| 4,201,253 | 5/1980 | Maloney | 141/392 |
| 4,210,181 | 7/1980 | Clevenger | 141/392 |
| 4,245,682 | 1/1981 | Agnew, Sr. | 141/392 |
| 4,334,560 | 6/1982 | Lockwood | 141/392 |
| 4,644,984 | 2/1987 | Abraham | 141/392 |
| 4,653,711 | 3/1987 | Marshell | 248/205.3 |
| 4,712,766 | 12/1987 | Ehrenhalt | 251/90 |
| 4,744,482 | 5/1988 | Ohsawa | 220/DIG. 33 |
| 4,746,089 | 5/1988 | Clapper | 248/309.4 |

Primary Examiner—Ernest G. Cusick
Attorney, Agent, or Firm—William M. Hobby, III

[57] ABSTRACT

A fuel pump nozzle handle lever holding system includes a strip of flexible material having hook and loop material attached to each side thereof and sized to extend around a fuel pump nozzle handle and lever when the lever is actuated to fill the tank of a vehicle. The flexible material has hook material on one side thereof and loop material on the other side thereof so that one side can be hooked to the other to hold a fuel pump lever in an actuated position. A piece of hook and loop material is attached to the vehicle inside the gas compartment door adjacent the filling tube opening for attaching the strip of flexible material and another piece of hook and loop material can be attached to the vehicle fuel tank filling tube cap for attaching to the piece of hook and loop material attached to the vehicle adjacent the fuel tank filling tube so that the cap can be held adjacent the filling tube during the filling operation.

4 Claims, 1 Drawing Sheet

FUEL PUMP LEVER HOLDING MEMBER

BACKGROUND OF THE INVENTION

The present invention relates to a fuel pump nozzle handle lever holding system and especially to a system utilizing a flexible material with hook and loop material attached thereto.

In the past, a wide variety of wedging or bracing devices have been utilized for latching gasoline pump nozzle levers in an actuated position so that the gas continues to flow into a vehicle fuel tank without an attendant or an operator having to hold the valve until the tank is filled. The tank nozzle typically contains a mechanism for sensing when the tank is filled by the backflow of fuel up the nozzle filling tube and to automatically shut off the valve to avoid the overflow and spilling of the fuel. Many gas pump nozzle handle lever members have a latching member hinged directly to the handle or handle guard for locking the lever in an open position. However, for those pump nozzles which do not have a blocking brace attached thereto, there are a number of U.S. patents, such as may be seen in the Opp patent, U.S. Pat. No. 4,278,116; the Rehkoph patent, U.S. Pat. No. 4,275,776, the Maloney patent, U.S. Pat. No. 4,201,253; and the Noe patent, U.S. Pat. No. 4,175,595, each of which patents show portable latches for gasoline pump nozzles for latching the pump handle valve lever in an open position. Each of these patents also has means for wedging a gasoline nozzle handle in a different stepped position to vary the flow from the nozzle. Typical of these patents is the Maloney patent for a gas pump lever blocking member having an elongated member with a first end adapted to engage the lever and a second end adapted to engage a lever guard in a plurality of positions corresponding to varying gas flow rates through the pump. An elongated member has a stepped portion at the second end defining a plurality of guard engagement surfaces lying in planes disposed along the elongation axis of the member.

In contrast to these prior art wedging devices, the present invention provides for a simple piece of flexible cloth which can be readily attached around a fuel pump nozzle handle and around the pump valve lever to hold the lever in an open position through tension applied against the flexible cloth rather than the compression from the wedging member. The use of a hook and loop material (VELCRO) allows for wide variety of adjustments for different flow rates without having to have specific stepped flow rates. In addition, the flexible cloth can be easily folded and stored in the pocket of a car but the present invention also provides for hook and loop material attached to the vehicle on the gas compartment door adjacent the filling tube opening for storing the flexible material with its own hook and loop material attached right beside the filling tube in a handy position for filling the vehicle fuel tank. The invention also contemplates the use of hook and loop material to hold the vehicle's gas cap while the vehicle is being filled with fuel.

SUMMARY OF THE INVENTION

The present invention relates to a fuel pump nozzle handle lever holding system having a strip of flexible material having hook and loop material attached to each side thereof and sized to extend around a fuel tank pump nozzle handle and lever when the lever is actuated while filling the tank of a vehicle. The flexible material has hook material on one side thereof and loop material on the other side thereof so that one can be hooked to the other to hold a fuel pump lever in the actuated position. Means to store the strip of material adjacent the vehicle fuel tank filling tube includes a strip of hook and loop material attached to the vehicle gas compartment door adjacent the fuel tank filling tube opening for attaching the flexible material with its own hook and loop material. The strip can be attached to the gas compartment door of the vehicle body. A second strip of hook and loop material may be attached to the cap of the vehicle fuel tank filling tube which can be readily attached to a second piece of hook and loop material attached to the vehicle compartment door or to the strip attached for holding the flexible material for holding the fuel pump nozzle handle lever so that the cap can be handily stored while filling the vehicle fuel tank.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
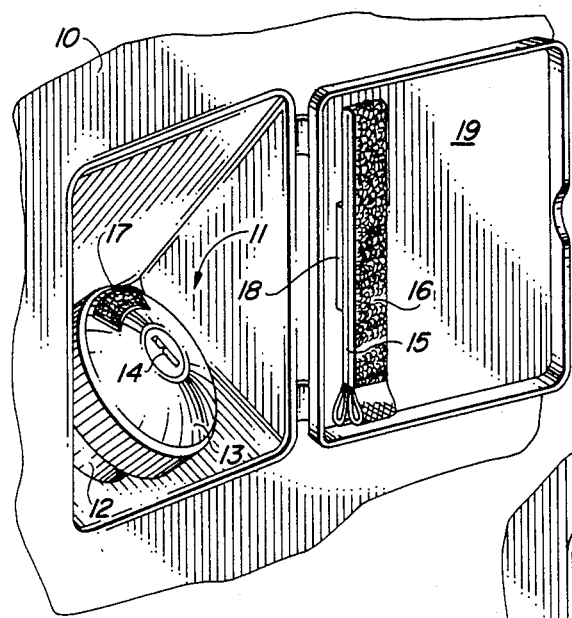
FIG. 1 shows a cut-away perspective of a vehicle fuel tank filling tube opening and cap in accordance with the present invention.
Figure 2:
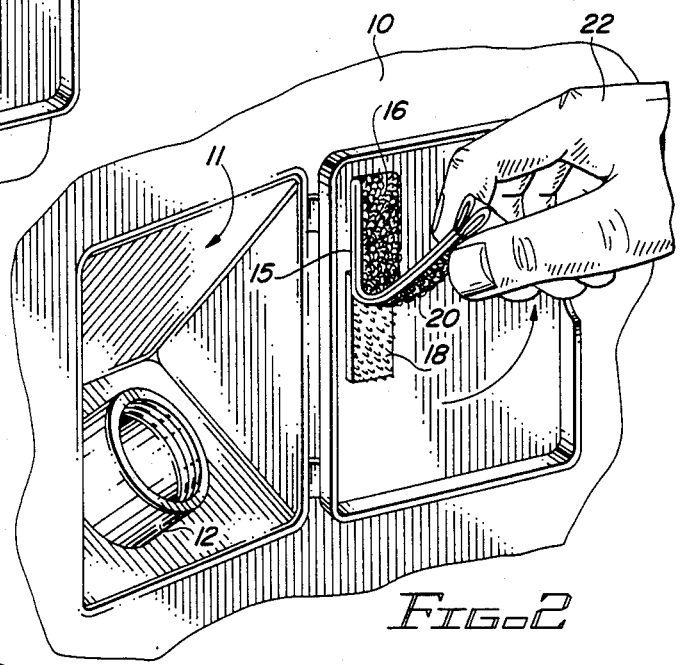
FIG. 2 is a perspective view in accordance with FIG. 1 having the hook and loop material being removed from the hook and loop storage strip.
Figure 3:
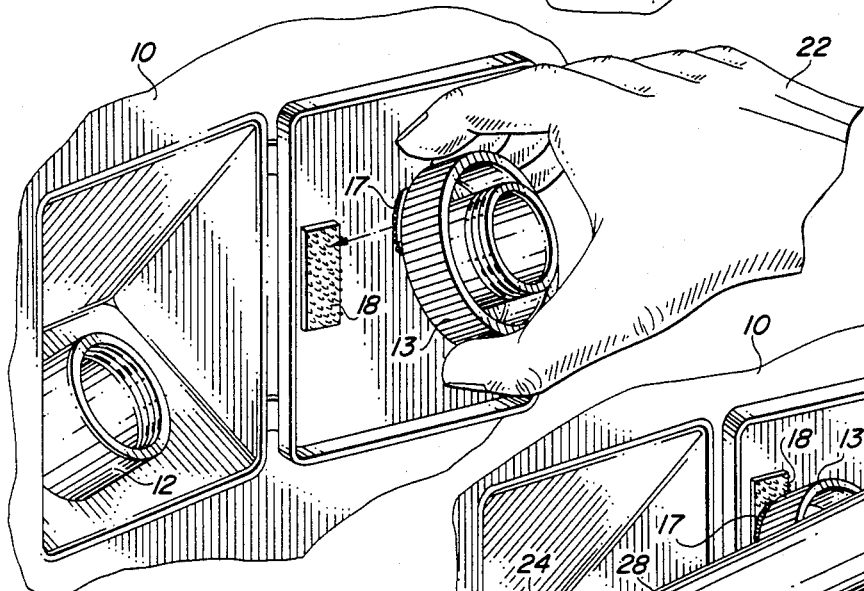
FIG. 3 is a perspective view of the embodiment of FIGS. 1 and 2 having the fuel tank filling tube cap being attached to hook and loop material.

Referring to FIGS. 1 through 4 of the drawings, a portion of a vehicle body 10 is illustrated and may be an automobile or light truck or the like. Typically, the vehicle body has a recessed area 11 having the protrusion of the vehicle fuel tank filling tube 12 extending therefrom and a cap 13 attached over the opening of the filling tube. The cap 13 may have a lock 14 to prevent fuel from being siphoned from the tank or from having the cap 13 stolen. A strip of hook and loop material (VELCRO) 15 is attached inside the recessed area 11 gas compartment door 19 of the body 10 and has a second strip of hook and loop material 16 attached thereto in FIGS. 1 and 2 and being removed in FIG. 2. The cap 13 also has a piece of hook and loop material 17 attached thereto. When the cap 13 is removed from the filling tube 12, as shown in FIG. 3, it can be attached to a second piece of hook and loop material 18 attached adjacent the recessed area 11 on the inside of the door 19 of the body 10. This holds the cap in ready view adjacent the opening so as to prevent the operator from forgetting to put the cap back on the filling tube 12. Since the hook and loop material (VELCRO) is readily snapped in place and quickly removed by simply pulling the cap, no time is lost in the filling of the vehicle fuel tank.

Figure 4:
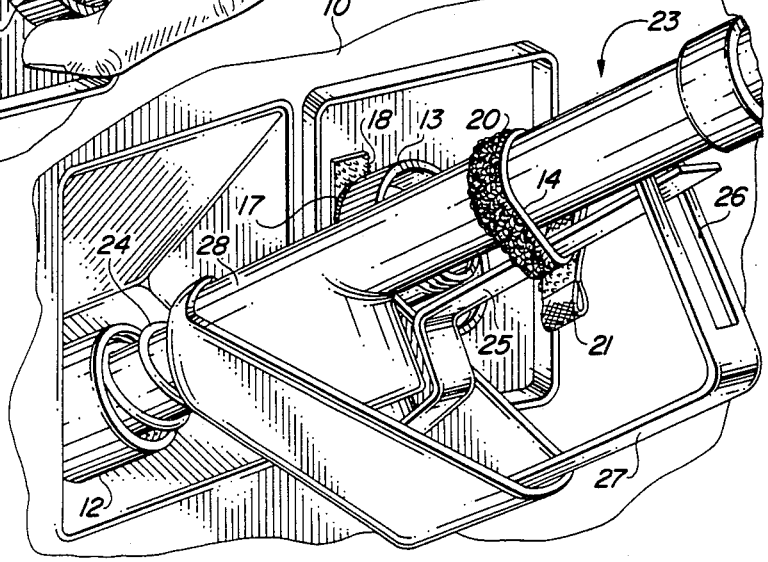
FIG. 4 is a perspective view of the embodiment of FIGS. 1 through 3 having a fuel pump nozzle inserted into the vehicle fuel tank filling tube and having the fuel pump nozzle handle lever supported with the flexible material of the present invention.

In FIG. 2, the strip of flexible material 16 has hook and loop material 20 on one side and a piece of hook and loop material 21 on the other side thereof. Hook and loop material 20 extends the entire length of the flexible piece of material 16 while the hook and loop material 21 may extend only a short distance for hooking the ends together as shown in FIG. 4. In FIGS. 2, a person's hand 22 is pulling the strip of flexible material 16 from the hook and loop material 15 for attaching as shown in FIG. 4.

In FIG. 4, a fuel pump nozzle 23 includes the nozzle spout 24 inserted into the filling tube 12 and a fuel pump nozzle handle lever 25 having one end sliding in a slot 26 in the guard 27 of the handle 23 when the lever 25 is pulled to actuate the valve in the nozzle 23 to allow fuel to enter the filling tube 12 to fill the tank within the vehicle 10. Once the lever 25 is actuated, the flexible material 16 can be wrapped therearound with the hook and loop material 20 attached to the hook and loop material 21 to lock the handle in a position as shown in FIG. 4. It should, however, be clear that VELCRO allows a wide variety of adjustments in the position of the handle 25 to vary the flow of fuel into the vehicle fuel tank. Merely changing the position of the connecting hook and loop material 20 with respect to the hook and loop material 21 varies the position as desired.

In operation, the material 15, 16, 17 and 18 can be purchased as a unit with an adhesive backing on the pieces 15, 17, and 18 which can be attached as shown in FIGS. 1-4. To fill the tank with fuel, the cap 13 is removed and the hook and loop material 17 attached to the hook and loop material 18. Flexible strip 16 is then removed from the hook and loop material 15. The gasoline pump nozzle 13 has a spout 24 inserted into the tube 12, and the handle lever 25 is pulled to actuate the flow of fuel and the strip 16 is wrapped around the handle portion 28 and the lever 25 and connected by the hook and loop material 21 connected to the hook and loop material 20. In practice, the hook material can be put on either side desired with the loop material on the other side for a coacting attachment. This cap pump holding member advantageously allows a wide variety of adjustments rather than a few stepped adjustments and holds the lever 25 by tension on the flexible material 16 rather than applying a wedging pressure and having a wedge that can potentially slip out from under the lever. In addition, the flexible material is inexpensive and easily stored adjacent the tank or in the pocket. Accordingly, the present invention is not to be construed as limited to the forms shown which are to be considered illustrative rather than restrictive.

I claim:

1. A fuel pump nozzle handle lever holding member for holding a fuel pump nozzle handle while filling a vehicle fuel tank through the vehicle fuel tank filling tube comprising:

in combination a vehicle having a fuel tank and filling tube and a strip of flexible material having hook and loop material attached to each side thereof and sized to extend around a fuel pump nozzle handle and lever when the lever is actuated while filling said vehicle fuel tank, said strip of flexible material having hook material on one side thereof and loop material on the other side thereof whereby one side can be hooked to the other to hold a fuel pump lever in an actuated position;

means to store said strip of flexible material adjacent said vehicle fuel tank filling tube, whereby the fuel pump nozzle handle lever holding member is kept handy for filling the vehicle with fuel; and said means to store said strip of flexible material adjacent said vehicle fuel tank filling tube having a piece of hook and loop material attached to the vehicle adjacent the fuel tank filling tube to hold said strip of flexible material during storage between fuel tank fills.

2. A fuel pump nozzle handle lever holding member in accordance with claim 1 in which said strip of flexible material has hook material covering one side thereof and said loop material covering at least a portion of the other side thereof.

3. A fuel pump nozzle handle lever holding member in accordance with claim 1 including a vehicle fuel tank filling tube cap having piece of hook and loop material attached thereto for attaching said cap to said piece hook and loop material attached to said vehicle during the filling of said vehicle fuel tank.

4. A fuel pump nozzle handle lever holding member in accordance with claim 1 including a vehicle fuel tank filling tube cap in which said second piece of hook and loop material is attached to said vehicle for holding said vehicle fuel tank filling tube cap while filling said vehicle's fuel tank.

* * * * *